(12) United States Patent
Brunner et al.

(10) Patent No.: US 8,712,956 B2
(45) Date of Patent: Apr. 29, 2014

(54) SYSTEMS AND METHODS TO PROVIDE REPORT PART VIA A WEB SERVICE

(75) Inventors: David J. M. Brunner, Vanves (FR); Nadir Loutfi, Osny (FR)

(73) Assignee: SAP AG, Walldorf (DE)

(*) Notice: Subject to any disclaimer, the term of this patent is extended or adjusted under 35 U.S.C. 154(b) by 793 days.

(21) Appl. No.: 12/413,882

(22) Filed: Mar. 30, 2009

(65) Prior Publication Data
US 2010/0250486 A1 Sep. 30, 2010

(51) Int. Cl.
*G06F 7/02* (2006.01)
*G06F 17/30* (2006.01)

(52) U.S. Cl.
USPC ............ 707/603; 707/752; 707/754; 707/776

(58) Field of Classification Search
USPC ........ 707/101, 102, 104.1, 999.101, 999.102, 707/999.107, 603, 752, 754, 758, 769, 776, 707/999.003
See application file for complete search history.

(56) References Cited

U.S. PATENT DOCUMENTS

2006/0015523 A1* 1/2006 Dick et al. .................... 707/102
2007/0276815 A1 11/2007 Naibo et al.
2009/0282385 A1* 11/2009 Boland et al. ................. 717/106

* cited by examiner

*Primary Examiner* — Bruce Moser
(74) *Attorney, Agent, or Firm* — Buckley, Maschoff & Talwalkar LLC

(57) ABSTRACT

Some aspects include reception of a selection of a part of a report, the selected report part associated with queries of a semantic layer, and creation of a description of a Web Service call to return contents of the selected report part. In some aspects, a Web Service call associated with a part of a report is received, the report part associated with queries of a semantic layer, and a query is determined based on the Web Service call to return contents of the report part.

49 Claims, 8 Drawing Sheets

SYSTEMS AND METHODS TO PROVIDE REPORT PART VIA A WEB SERVICE

BACKGROUND

Enterprise software systems receive, generate and store data related to many aspects of a business enterprise. Reporting systems are commonly used to present such enterprise data to users in a coherent manner.

Reporting systems typically allow a report designer to create a report specification, which includes a layout of one or more report parts (e.g., sections, tables, charts, header, footer, etc.) and specifies the data which is to populate the report parts. When a report is requested, the systems provide a populated report based on stored enterprise data and the report specification. If the relevant data changes, a subsequently-generated report will include the changed data.

To facilitate report design, reporting systems such as BusinessObjects XI® interact with a semantic layer including a set of abstract entities known as semantic objects, each of which associates one or more physical entities of one or more enterprise data sources with user-friendly names. Accordingly, a report designer lays out report parts based on the user-friendly names, and the reporting system automatically generates queries of the semantic layer which will return appropriate data from the data source(s) to populate the report parts. A report specification therefore includes both the layout and the associated queries.

However, a report created based on such a report specification may only be consumed (i.e., viewed) through a proprietary client application which is designed to communicate with the reporting system. Since a report (as well as each report part thereof) may contain not just raw data, but also answers to business questions, it is desirable to provide other mechanisms for consuming a report.

Commonly-assigned, co-pending U.S. patent application Ser. No. 11/752,803 describes a system which allows a user to create Web Services for directly querying a semantic layer, which in turn queries an associated data source. These Web Services may be consumed by any user interface capable of consuming Web Services. However, data returned by these Web Services lacks business context, comes from a single source, and does not include any metadata information. Moreover, the system undesirably requires increased processing by the semantic layer and the underlying database.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
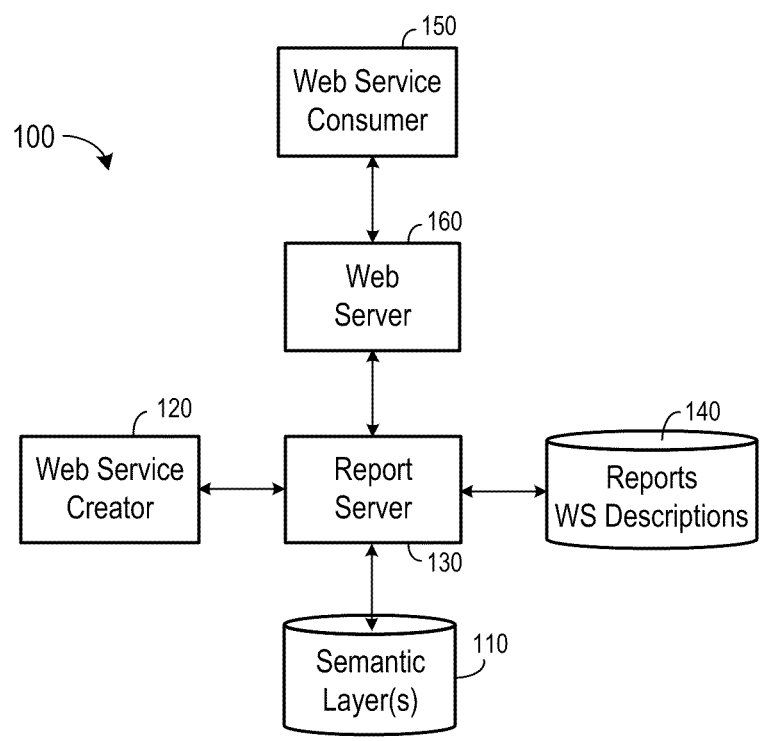
FIG. 1 is a block diagram of a system according to some embodiments.

FIG. 1 is a block diagram illustrating system 100 according to some embodiments. Each element of system 100 may comprise any suitable combination of hardware and/or software, and each element may be located remote from one or more other elements. System 100 may operate to create and/or respond to a Web Service call based on a report part according to some embodiments. Embodiments are not limited to system 100.

Semantic layer(s) 110 may comprise any data source which supports entities and relations therebetween. Semantic layer(s) 110 may comprise a set of semantic objects as described above. The semantic objects may exhibit properties (i.e., metadata), such as a data type (e.g., text or numeric), a "qualification" (e.g., dimension, measure, detail . . . ), a "business type" (e.g., financial, time, geography, KPI . . . ), and a structure (e.g., OLAP hierarchies). Types of semantic layers and semantic objects are described in U.S. Pat. No. 5,555,403, and are provided by Business Objects products or other Business Intelligence products. Examples of semantic layer(s) 110 according to some embodiments include Business Objects Universes and OLAP data models.

Web Service creator 120 may comprise any application (e.g., JAVA applet, rich client, ActiveX control) to view reports and their constituent parts. Each report part is associated with queries of semantic layer(s) 110. Via report server 130, Web Service creator 120 may access report specifications and populated reports stored in repository 140. According to some embodiments, Web Service creator 120 is a component of a client application for designing reports.

Report server 130 responds to requests from Web Service creator 120 to retrieve data from repository 140 and store data in repository 140. Repository 140 may also store populated reports for efficient access thereof. Report server 130 may populate reports by querying semantic layer(s) 110 using queries associated with parts of the reports.

Figure 2:
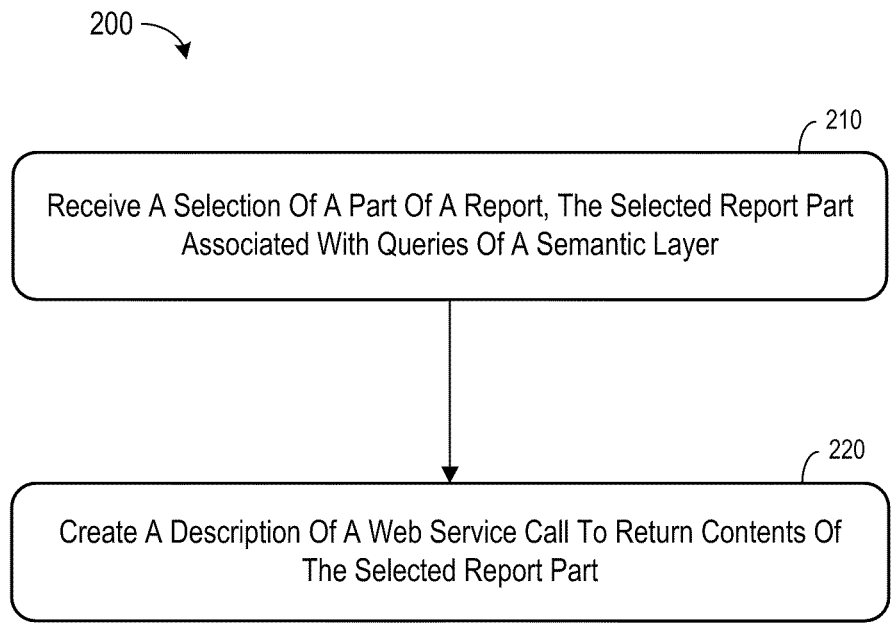
FIG. 2 is a flow diagram of a process according to some embodiments.

FIG. 2 is a flow diagram of process 200 according to some embodiments. Process 200 may be executed by hardware and embodied in program code stored on a tangible computer-readable medium. Process 200 will be described below as if performed by Web Service creator 120, but embodiments are not limited thereto.

Initially, at 210, Web Service creator 120 receives a selection of a part of a report. The selection may be input by a user operating Web Service creator 120. The report may be stored in repository 140 and the selected report part may be associated with queries of semantic layer(s) 110. A detailed example of 210 according to some embodiments is set forth below.

Next, at 220, a description of a Web Service call is created. The Web Service call is intended to return contents of the selected report part. In some embodiments, Web Service creator 120 creates the description and passes the description to report server 130 for storage in repository 140. Alternatively, report server 130 may receive an instruction to create the description based on data received from Web Service creator 120 and may create and store the description. Further details of 220 according to some embodiments are also set forth below.

A Web Service as mentioned herein is associated with an interface describing how to communicate with the Web Service. The interface may be described in Web Service Description Language (WSDL), an eXtensible markup Language (XML)-based standard. A client such as Web Service consumer 150 interacts with a Web Service as prescribed by its WSDL interface using messages (e.g., XML messages) enclosed in a container (e.g., Simple Object Access Protocol (SOAP)) and conveyed using a Hypertext Transport Protocol (HTTP) request. Embodiments are not limited to the foregoing standards.

Web Service consumer 150 may comprise any system capable of consuming Web Services as described above. Examples of Web Service consumer 150 include, but are not limited to, Crystal Xcelsius®, Microsoft Office®, and SAP Netweaver®.

Web server 160 is capable of responding to HTTP requests and communicating with report server 130. In some embodiments, Web server 160 communicates with report server 130 using a same protocol as used by Web Service creator 120 to communicate with report server 130 (e.g., WebI server commands invoked internally via API calls).

Figure 3:
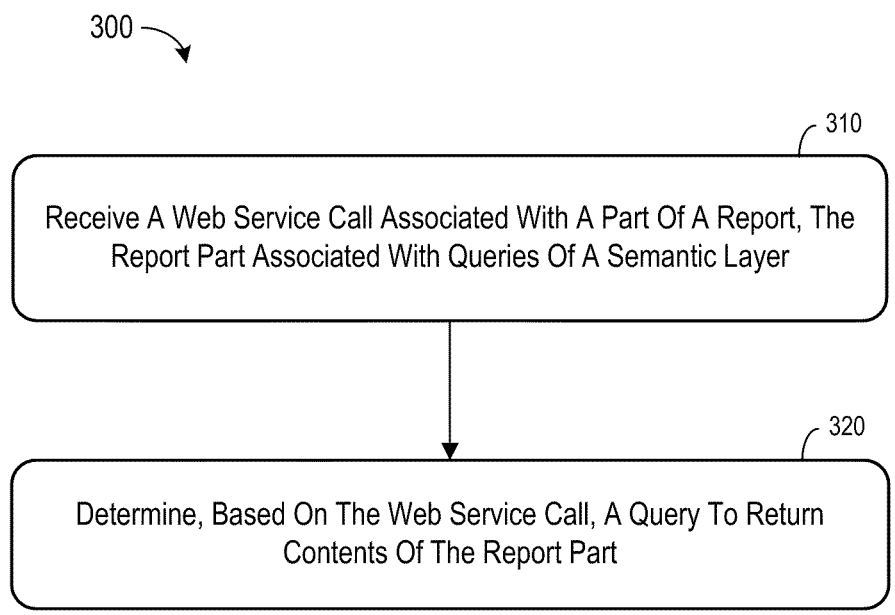
FIG. 3 is a flow diagram of a process according to some embodiments.

FIG. 3 is a flow diagram of process 300 according to some embodiments. Process 300 may be executed by hardware and embodied in program code stored on a tangible computer-readable medium. Process 300 will be described below as if performed by Web server 160, but embodiments are not limited thereto.

Web server 160 may receive a Web Service call associated with a part of a report at 310. As described above, the report part may be associated with queries of a semantic layer. According to some embodiments, Web server 160 receives the Web Service call from Web Service consumer 150 as an HTTP request. The HTTP request may comprise a SOAP message including XML messages conforming to a known WSDL interface.

Based on the received Web Service call, Web server 160 determines a query to return contents of the report part. Determination of the query may be based on the Web Service descriptions of repository 140. For example, Web server 160 may query report server 130 for a reference to the report part, and report server 130 may retrieve such a reference from the associated Web Service descriptions of repository 140. Web server 160 then determines the query to return contents of the report part based on the reference.

Using the determined query, Web server 160 may invoke report server 130 to retrieve the contents of the report part associated with the Web Service. Again, the contents may be stored among the populated reports of repository 140. Web server 160 may encapsulate the received contents into an HTTP response and transmit the response to Web Service consumer 150.

As will be described in detail below, a Web Service call created according to some embodiments may be associated with parameters. The parameters may allow a Web Service consumer to specify transformations (e.g., drilling, formatting, filtering) to be applied to the report part contents. Accordingly, report server 130 may apply such transformations to the retrieved contents before passing the contents to Web server 160.

In some embodiments, Web Service consumer 150 may transmit several Web Service calls associated with different report parts but including the same set of input parameters (e.g., the same filtering and/or drilling instructions). As a result, Web Service consumer 150 may receive contents of the different report parts filtered and/or drilled according to a same axis.

According to some embodiments, report parts such as tables and charts may be associated not only with data but with calculations. Report parts may also or alternatively combine data from different data sources (e.g., semantic layers). Sharing report parts via Web Services according to some embodiments may reduce the complexity of consumers (e.g., by eliminating coding to support to filtering, slicing or drilling data), and also reduce their computing load.

Figure 4:
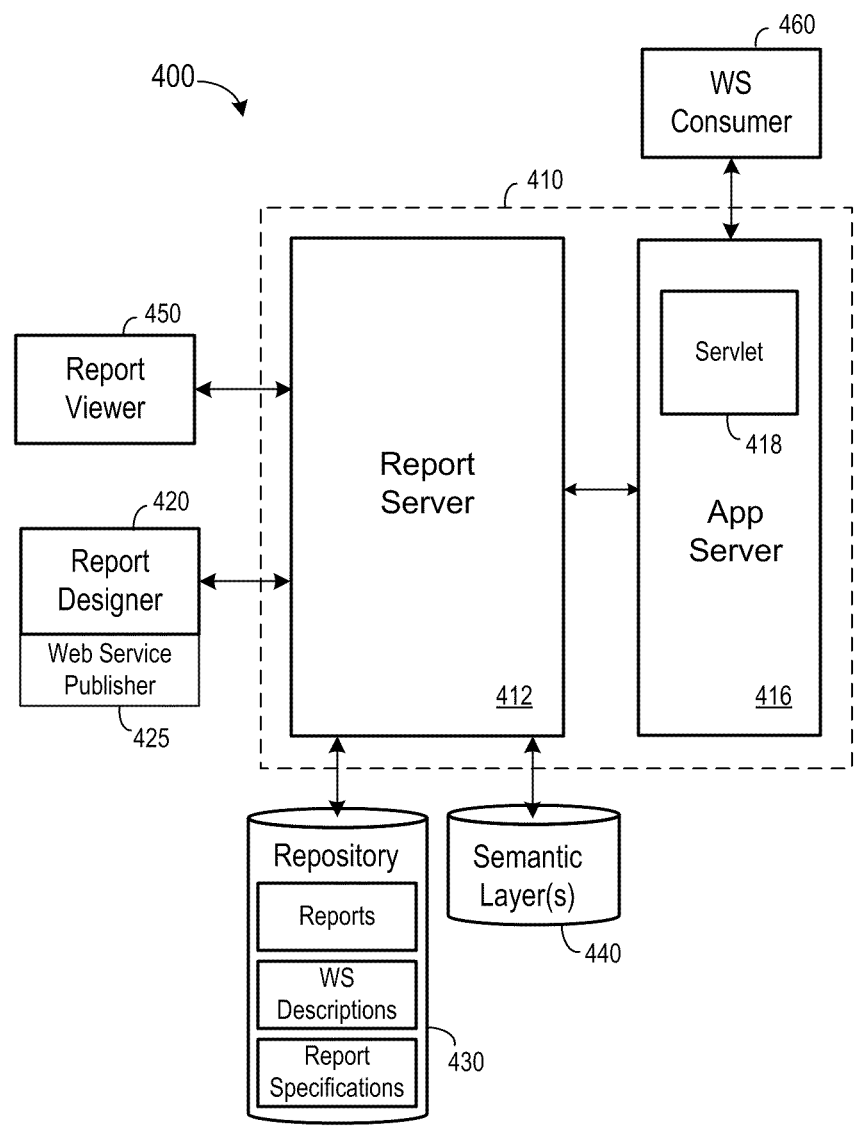
FIG. 4 is a block diagram of a system according to some embodiments.

FIG. 4 is a generic block diagram of architecture 400 according to some embodiments. Architecture 400 may implement any one or more of the processes described herein, but embodiments are not limited thereto. Architecture 400 may comprise any suitable combination of hardware and software that is or becomes known. Architecture 400 is based around Business Intelligence (BI) server 410, which may be implemented by BusinessObjects XI®.

BI server 410 includes report server 412 (e.g., BusinessObjects Web Intelligence server) and application server 416. Report server 412 may receive commands from report designer 420 to create and modify report specifications and Web Services according to some embodiments. In this regard, report designer 420 includes Web Service publisher plug-in 425 to provide functionality relating to Web Service publishing. Examples of this functionality according to some embodiments are set forth below. Report designer 420 may comprise any suitable device executing program code of a rich client application (e.g., Web Intelligence Rich Client), an applet in a Web browser or other applet viewer, or any other application to perform the processes attributed thereto herein.

Repository 430 stores report specifications and Web Service descriptions created by report designer 420 and Web Service publisher 425. Repository 430, which may comprise a Central Management Storage, may also store populated reports based on the stored report specifications. The report specifications and corresponding reports include report parts which are associated with queries of semantic layer(s) 440.

Semantic layer(s) 440 may comprise a set of semantic objects (e.g., dimensions, measures, details) as described above. The semantic objects may represent physical data of one or more data sources (unshown), including but not limited to relational databases, enterprise applications, legacy applications, Online Analytical Processing (OLAP) sources and other data sources. One of semantic layer(s) 440 may represent data from one or more data sources, and two or more of semantic layer(s) 440 may represent data from a same data source.

Report viewer 450 may comprise any suitable device executing program code of a rich client application (e.g., InfoView), an applet in a Web browser (e.g., WebI Portal), or any other application. Report viewer 450 may access BI server 410 to view and interact with reports stored in repository 430 according to some embodiments. Report viewer 450 may communicate with report server 412 via a proprietary communication protocol (e.g., WebI server commands).

Application server 416 provides additional functionality to BI server 410. According to some embodiments, application server 416 comprises an HTTP server including servlet 418. Servlet 418 may receive a Web Service call from Web Service consumer 460, query report server 412 for a reference to the report part as specified in the Web Service descriptions of repository 430, determine a query to return contents of the report part based on the reference, receive the contents of the report part from report server 412 based on the received Web Service call, and transform the contents into an HTTP message.

Web Service consumer 460 may comprise any system capable of consuming Web Services as described above. Although only one Web Service consumer 460 is illustrated in FIG. 4, any number and type of Web Service consumer may utilize the features of some embodiments.

Architecture 400 may include other unshown components to provide functionality other than that described herein. For example, BI server 410 may include components to provide security, session management, and report delivery services (e.g., scheduling, publishing, dashboards).

Figure 5:
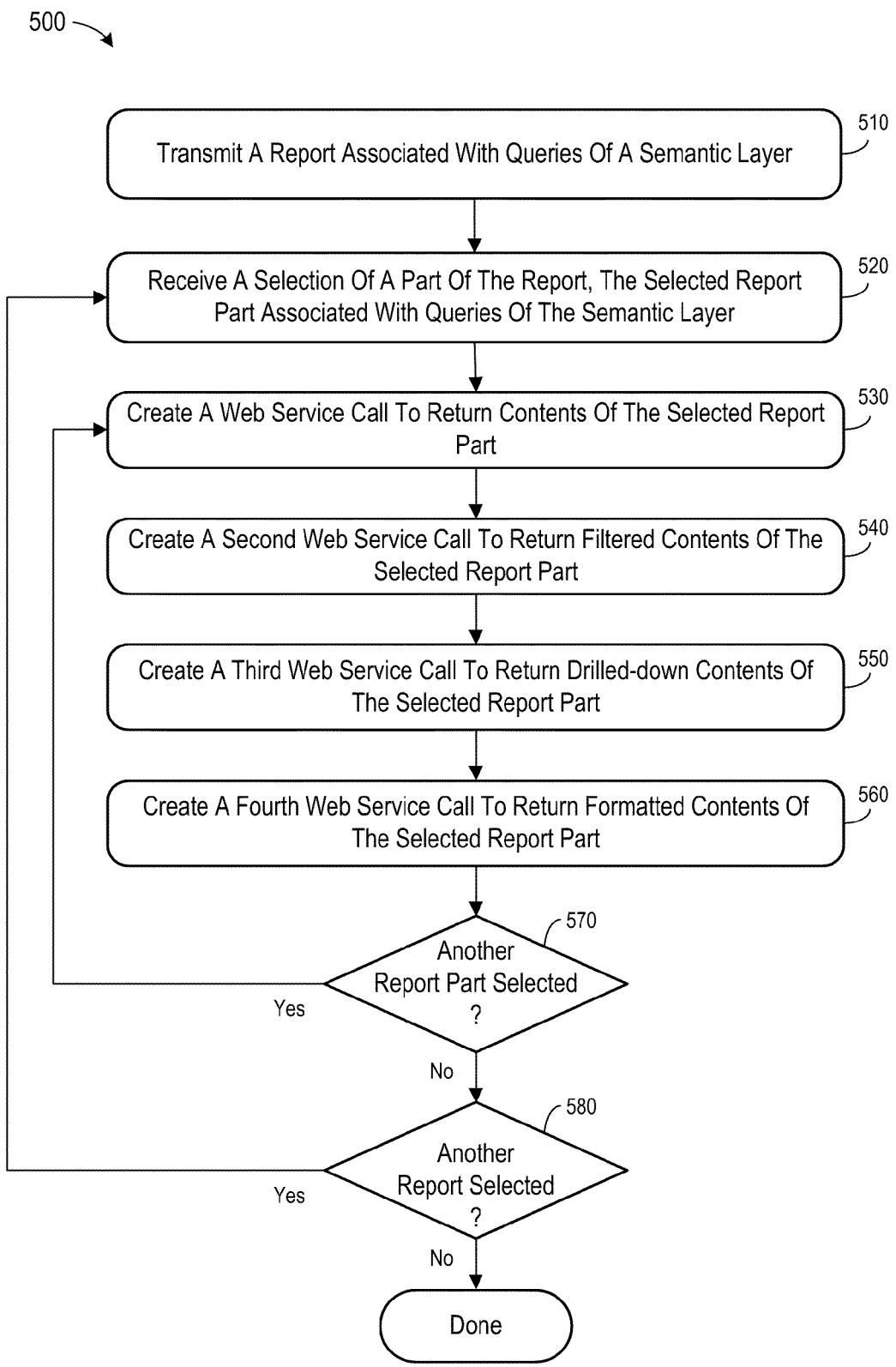
FIG. 5 is a flow diagram of a process according to some embodiments.

FIG. 5 is a flow diagram of process 500 according to some embodiments. Process 500 may be executed by hardware and/or embodied in program code stored on a tangible computer-readable medium. Process 500 may comprise an implementation of process 200, but embodiments are not limited thereto. Process 500 will be described below as if executed by elements of architecture 400 but, again, embodiments are not limited thereto.

Prior to process 500, report server 412 may transmit a list of reports stored in repository 430 to report designer 420 for display to a user. The user may operate report designer 420 to select one of the reports which, as described above, is associated with queries of a semantic layer. In response to the selection, report server 412 transmits the selected report to report designer 420 at 510.

Figure 6:
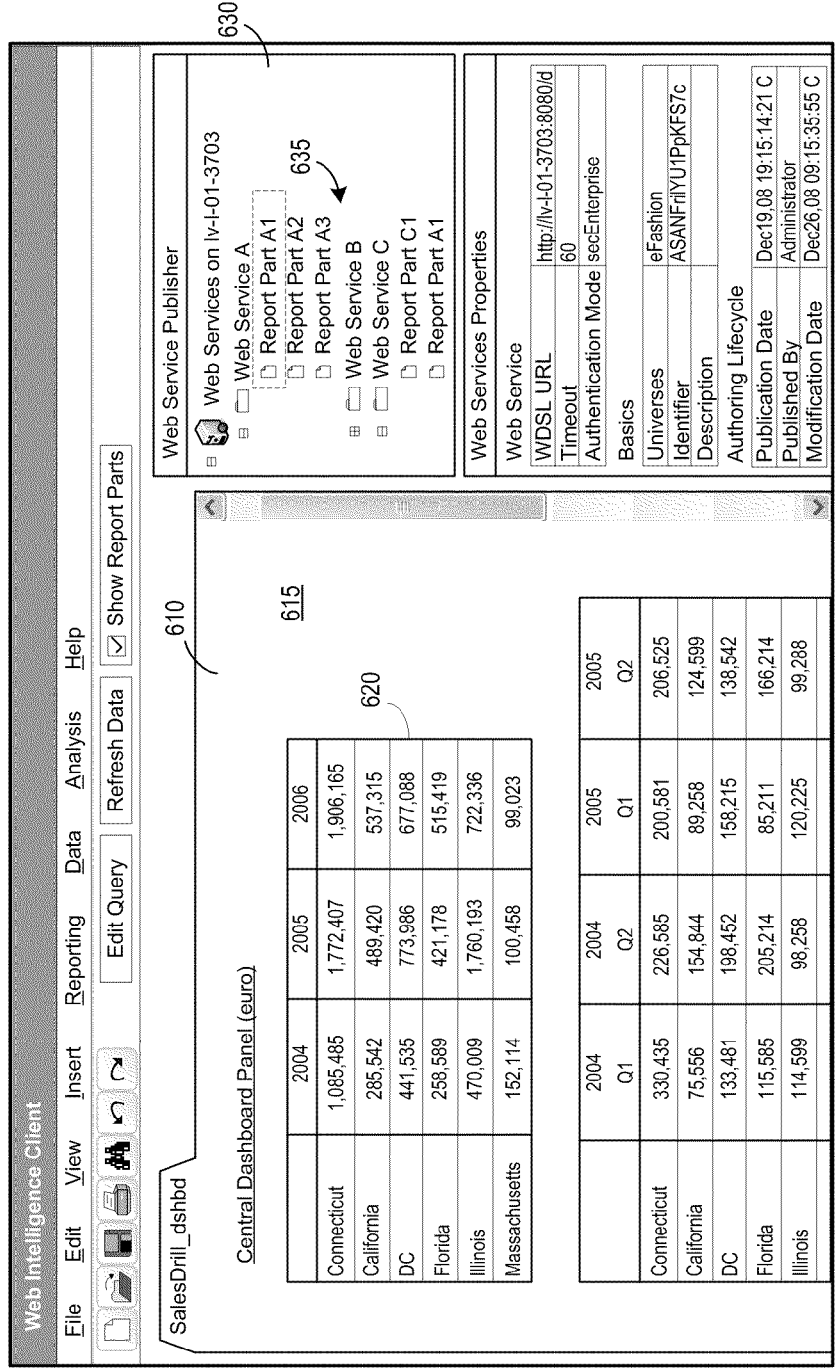
FIG. 6 comprises an outward view of a user interface to publish a Web Service according to some embodiments.

FIG. 6 is an outward view of user interface 600 of report designer 420 according to some embodiments. Window 610 shows report 615 which was transmitted to report designer 420 according to an example of 510. A user may invoke various functions of user interface 600 to modify report 615 as is known in the art. As will be described below, some embodiments allow a Web Service call to be designed and published directly from a report editor (e.g., report designer 420).

A selection of a report part is received at 520. The selected report part is also associated with queries of a semantic layer. The selected report part may comprise a chart, a table of any format, or even one of the queries of the report. For example, the user may select report part 620 at 520 in order to create Web Service calls based on the selected report part.

Window 630 of user interface 600 is provided by Web Service publisher 425 according to some embodiments. Tree structure 635 illustrates a hierarchy of Web Services and Web Service calls based on the Web Service descriptions stored in repository 430. Each branch of tree structure 635 specifies a Web Service (or BI Service), one or more reports associated with the Web Service, and one or more report parts of each report. Each report part of tree structure 635 corresponds to a published Web Service call. Window 640 illustrates properties of a Web Service selected in window 630.

Figure 7:
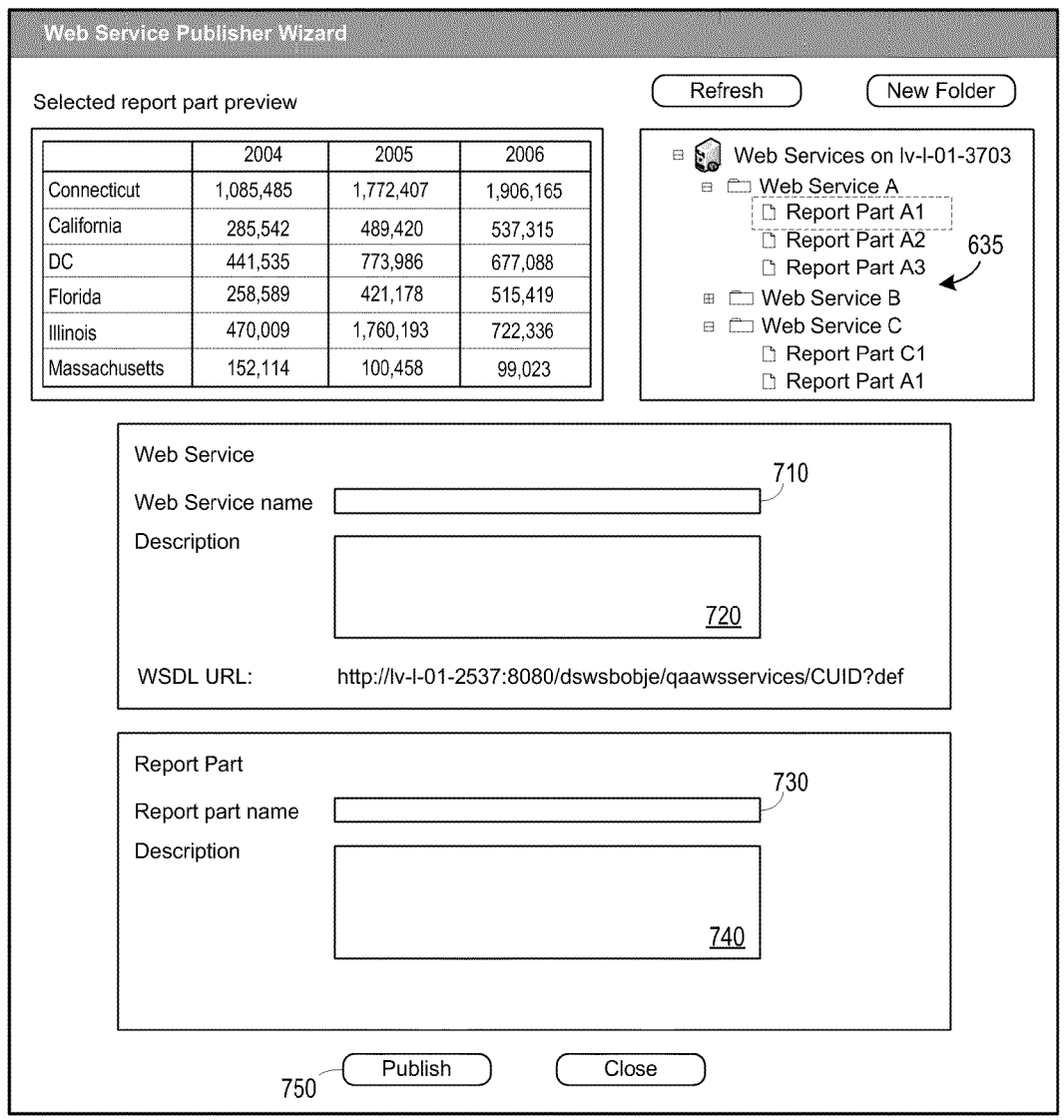
FIG. 7 comprises an outward view of a user interface to design a Web Service according to some embodiments.

A Web Service call is created at 530 based on the selected report part. The Web Service call is intended to return contents of the selected report part. FIG. 7 illustrates user interface 700 of a wizard to assist in creation of a Web Service call according to some examples of 530. User interface 700 may also be provided by Web Service publisher 425.

User interface 700 presents tree structure 635 as described above. User interface 700 allows the user to specify where the newly-created Web Service call is to reside in tree structure 635. In this regard, user interface 700 also provides fields 710 and 720 for specifying a name and description of a Web Service (if a folder of tree structure 635 is selected), and fields 730 and 740 for providing a name and description identifying the selected report part. Field 730 may be populated with the actual name of the report part by default.

A Web Service call can therefore be added to either an existing Web Service or a newly-defined Web Service. From a user's point of view, a Web Service may comprise a logical container of one or more Web Service calls. The Web Service calls of a Web Service may be associated with report parts of one or more reports. Moreover, the one or more reports may be associated with one or more semantic layers. Accordingly, a Web Service (or a Web Service call) may provide data from more than one semantic layer. A Web Service consumer may therefore build a dashboard based on any number of different data sources.

Publish icon 750 may be selected to initiate creation (or update) of a Web Service call based on the selected report part at 530. In response, report server 412 may create a corresponding description of the Web Service call among the Web Service descriptions of repository 430. According to some embodiments, the Web Service call is to return the contents of the selected report part in several fields (e.g., headers, footers, contents, and metadata). When a new Web Service (i.e., a container for Web Service calls) is to be created, Web Service publisher 425 automatically generates a new unique URL for consumers to invoke the Web Service and registers the URL in repository 430. Exhibit A, presented below, provides an example of a Web Service Description according to some embodiments.

According to some embodiments, selection of Publish icon 750 results in creation of several Web Service calls corresponding to the selected report part. For example, a second Web Service call is created at 540 to return filtered contents of the selected report part. The second Web Service call includes parameters by which a consumer may specify filtering constraints.

Next, at 550, a third Web Service call is created to return drilled-down contents of the selected report part. Parameters of the third Web Service call may allow a consumer to specify a drilling direction, drilling steps and a drilling target. A fourth Web Service call is then created at 560 to return contents of the report part which are formatted according to consumer-specified parameters. Such parameters may allow specification of the data layout, limiting (i.e., chunking) of the number of returned rows, etc.

One or more of the above-described Web Service calls may provide a set of optional input parameters allowing combination of several types of constraints (e.g., drilling and filtering). For example, Exhibit A describes several Drill_*** Web Service methods. The method Drill_StateQuantities provides input parameter DrillPath to specify drill primitives and input parameter DrillFilter to specify a filter. The parameter Drill-Path is a tuple allowing specification of a direction (i.e., parameter drillOperation, which can either be up or down), a dimension (i.e., parameter from), and a value from which drilling is to commence (i.e., parameter value). Several Drill-Path parameters can be coordinated in a single call to command a drill action on different dimensions. DrillFilter is a tuple to specify data filtering when performing a drill action. Within the tuple, parameter dimension specifies a block filter (i.e., any report object, including dimensions and measures), parameter value specifies a value to use for the block filter, and parameter operator specifies a filtering operation to use (e.g., equal, not equal, greater than, etc. . . . ).

Other input parameters may govern how data is to be retrieved. For example, a consumer may specify that data is to be retrieved from a last instance of a scheduled report (optimizing performance) or from a newly-refreshed report (optimizing data quality).

Returning to process 500, flow proceeds from 560 to 570 to determine whether another part of the previously-selected report has been selected. If so, flow returns to 530 and proceeds as described above to create Web Service calls to return contents of the selected report part. The Web Service calls may be associated with a same or different Web Service as the previously-created Web Service calls.

If no other part of the previously-selected report is selected, flow continues to 580 to determine whether another report has been selected. If so, flow returns to 520 and proceeds as described above to select a report part of the newly-selected report and to create Web Service calls based thereon. The Web Service calls may be added to the same Web Service to which the previously-created Web Service calls were added. Flow terminates after the user has finished selecting report parts and reports from which to create Web Services.

Figure 8:
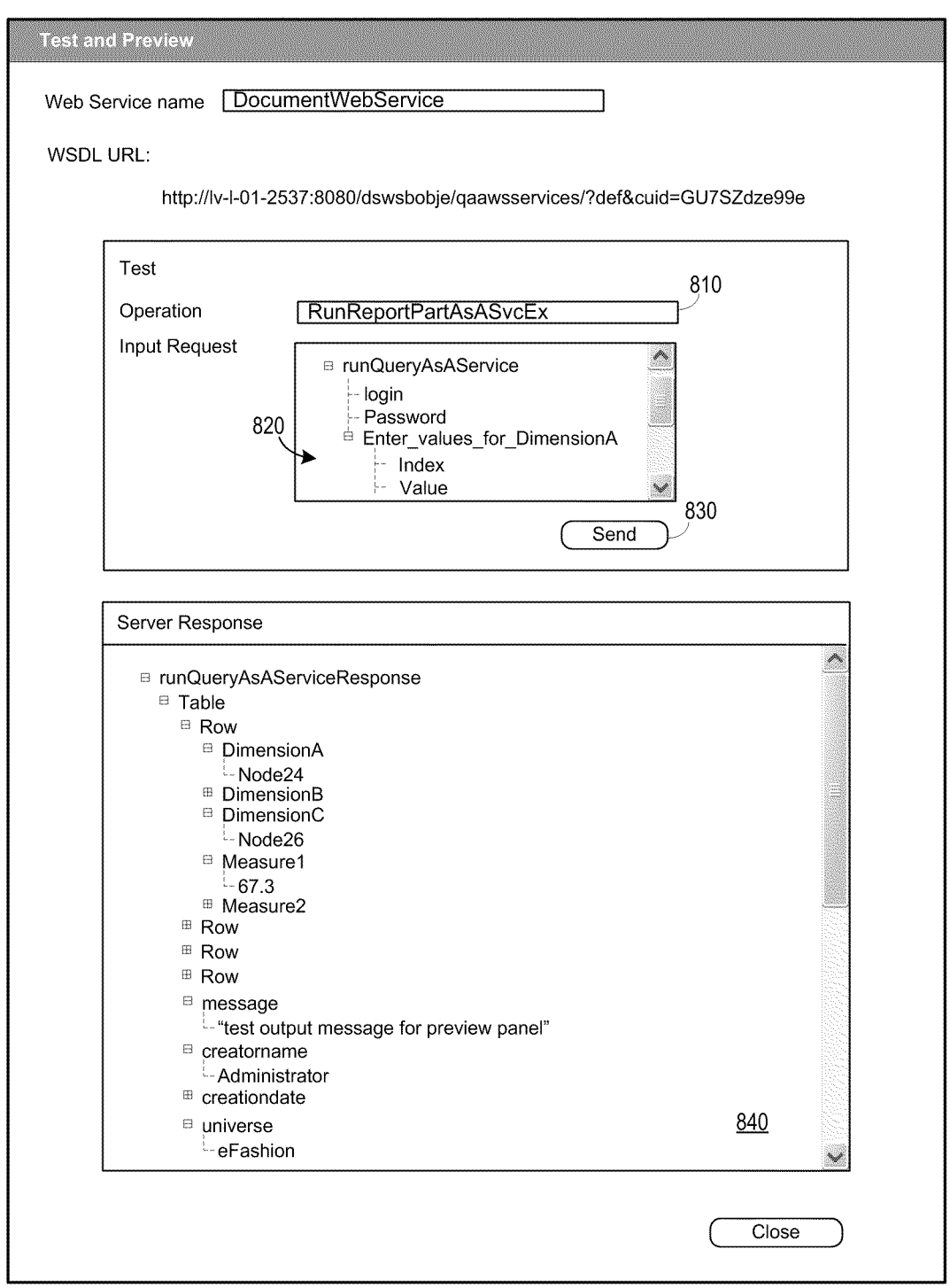
FIG. 8 comprises an outward view of a user interface to test and preview a Web Service according to some embodiments.

FIG. 8 illustrates Test and Preview window 800 according to some embodiments. Window 800 allows a user to review published Web Service calls in a dedicated window of Web Service publisher 425. In the illustrated example, field 810 allows a user to specify a particular Web Service call, and window 820 allows the user to specify input parameters for the specified Web Service call. Send icon 830 is selected to send the Web Service call to report server 412, and the resulting response (i.e., contents of a report part) is displayed in window 840.

Figure 9:
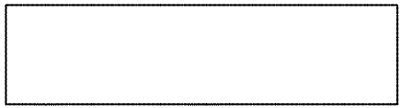
FIG. 9 comprises an outward view of a user interface illustrating stored metadata associated with a Web Service according to some embodiments.

Window 900 of FIG. 9 illustrates Web Service metadata that is stored in repository 430 according to some embodiments. As shown, the Web Service DocExample is associated with two Web Service calls corresponding to report parts of two different reports. Also specified is information relating to drilling and filtering parameters of each report part.

Web Service consumer 460 may invoke a Web Service described in repository 430 using an HTTP request sent to servlet 418 according to the associated Web Service URL. Servlet 418 may be implemented using the managequeryasaservice servlet described in aforementioned co-pending application Ser. No. 11/752,803, which is herein incorporated by reference for all purposes. This HTTP request may specify the Web Service call with all necessary and optional parameters using standard protocols.

In some examples, servlet 418 parses the HTTP request to transform it into a query to repository 430, allowing retrieval of the invoked Web Service, its attribute data, and references to the document, report and part requested. Using this information, servlet 418 invokes report server 412 to open and parse the corresponding report(s) of repository 430 to retrieve the requested content and apply any requested transformations.

Servlet 418 then retrieves the content and metadata corresponding to the initial request from report server 412, transforms the content and metadata into an HTTP response complying with the SOAP protocol, and transmits the response to Web Service consumer 460. Since the response embeds metadata from the WSDL, Web Service consumer 460 can relate Web Service calls to various report parts it may consume.

The above-described workflow may improve consistency and performance by delegating most of the data processing to report server 412 and repository 430, with servlet 418 primarily to manage transformations between HTTP requests and API calls. Some embodiments may reduce database dependency (e.g., few to no database connections are required to serve Web Service requests), and minimize content transformations that may be required by servlet 418 or Web Service consumer 460. Such features may provide suitable response times and scalability.

The embodiments described herein are solely for the purpose of illustration. Those in the art will recognize that other embodiments may be practiced with modifications and alterations limited only by the claims.

---

Exhibit A

```
<?xml version="1.0" encoding="UTF-8" ?>
- <definitions xmlns:http="http://schemas.xmlsoap.org/wsdl/http/"
    xmlns:soap="http://schemas.xmlsoap.org/wsdl/soap/"
    xmlns:s="http://www.w3.org/2001/XMLSchema" xmlns:s0="TestDemo"
    xmlns:tns1="dsws.businessobjects.com" targetNamespace="TestDemo"
    xmlns="http://schemas.xmlsoap.org/wsdl/" name="queryasaservice">
- <types>
- <s:schema elementFormDefault="qualified" targetNamespace="TestDemo">
- <s:complexType name="FilterCondition">
- <s:sequence>
    <s:element name="value" type="s:string" />
    <s:element name="operator" type="s:string" />
      </s:sequence>
      </s:complexType>
- <s:complexType name="LovValueIndex">
- <s:sequence>
    <s:element name="valueofPrompt" type="s:string" />
    <s:element name="index" type="s:string" />
      </s:sequence>
      </s:complexType>
- <s:complexType name="DrillFilter">
- <s:sequence>
    <s:element name="dimension" type="s:string" />
    <s:element name="value" type="s:string" />
    <s:element name="operator" type="s:string" />
      </s:sequence>
      </s:complexType>
- <s:element name="GetReportBlock__StateQuantities">
- <s:complexType>
- <s:sequence>
    <s:element name="login" type="s:string" />
    <s:element name="password" type="s:string" />
    <s:element name="resetState" type="s:boolean" />
```

Exhibit A

```
    <s:element name="refresh" type="s:boolean" />
      </s:sequence>
    </s:complexType>
  </s:element>
- <s:element name="GetReportBlock_StateRevenue">
- <s:complexType>
- <s:sequence>
  <s:element name="login" type="s:string" />
  <s:element name="password" type="s:string" />
  <s:element name="Sales_revenue" type="s0:FilterCondition" minOccurs="0"
      maxOccurs="unbounded" />
  <s:element name="State" type="s0:FilterCondition" minOccurs="0"
      maxOccurs="unbounded" />
  <s:element name="resetState" type="s:boolean" />
  <s:element name="refresh" type="s:boolean" />
    </s:sequence>
  </s:complexType>
  </s:element>
- <s:complexType name="DrillPath">
- <s:sequence>
  <s:element name="from" type="s:string" />
  <s:element name="value" type="s:string" />
  <s:element name="drillOperation" type="s:string" />
    </s:sequence>
  </s:complexType>
- <s:element name="Drill_StateQuantities">
- <s:complexType>
- <s:sequence>
  <s:element name="login" type="s:string" />
  <s:element name="password" type="s:string" />
  <s:element name="drillPath" type="s0:DrillPath" minOccurs="0"
      maxOccurs="unbounded" />
  <s:element name="filter" type="s0:DrillFilter" minOccurs="0"
      maxOccurs="unbounded" />
  <s:element name="resetState" type="s:boolean" />
  <s:element name="refresh" type="s:boolean" />
    </s:sequence>
  </s:complexType>
  </s:element>
- <s:element name="Drill_StateRevenue">
- <s:complexType>
- <s:sequence>
  <s:element name="login" type="s:string" />
  <s:element name="password" type="s:string" />
  <s:element name="drillPath" type="s0:DrillPath" minOccurs="0"
      maxOccurs="unbounded" />
  <s:element name="filter" type="s0:DrillFilter" minOccurs="0"
      maxOccurs="unbounded" />
  <s:element name="resetState" type="s:boolean" />
  <s:element name="refresh" type="s:boolean" />
    </s:sequence>
  </s:complexType>
  </s:element>
- <s:complexType name="TRow">
- <s:sequence>
  <s:element name="cell" type="s:anyType" maxOccurs="unbounded" nillable="true" />
    </s:sequence>
  </s:complexType>
- <s:complexType name="TTable">
- <s:sequence>
  <s:element name="row" maxOccurs="unbounded" type="s0:TRow" />
    </s:sequence>
  </s:complexType>
- <s:complexType name="THeader">
- <s:sequence>
  <s:element name="row" maxOccurs="unbounded" type="s0:TRow" />
    </s:sequence>
  </s:complexType>
- <s:complexType name="TFooter">
- <s:sequence>
  <s:element name="row" maxOccurs="unbounded" type="s0:TRow" />
    </s:sequence>
  </s:complexType>
- <s:element name="GetReportBlock_StateQuantitiesResponse">
- <s:complexType>
- <s:sequence>
  <s:element name="table" type="s0:TTable" />
  <s:element name="headers" type="s0:THeader" />
```

-continued

Exhibit A

```
<s:element name="footers" type="s0:TFooter" />
<s:element name="user" type="s:string" />
<s:element name="documentation" type="s:string" />
<s:element name="documentname" type="s:string" />
<s:element name="lastrefreshdate" type="s:dateTime" />
<s:element name="creationdate" type="s:dateTime" />
<s:element name="creator" type="s:string" />
<s:element name="isScheduled" type="s:boolean" />
<s:element name="scheduleStartTime" type="s:dateTime" />
<s:element name="scheduleEndTime" type="s:dateTime" />
<s:element name="tableType" type="s:string" />
<s:element name="nbColumns" type="s:int" />
<s:element name="nbLines" type="s:int" />
    </s:sequence>
  </s:complexType>
 </s:element>
- <s:element name="Drill_StateQuantitiesResponse">
- <s:complexType>
- <s:sequence>
  <s:element name="table" type="s0:TTable" />
  <s:element name="headers" type="s0:THeader" />
  <s:element name="footers" type="s0:TFooter" />
  <s:element name="user" type="s:string" />
  <s:element name="documentation" type="s:string" />
  <s:element name="documentname" type="s:string" />
  <s:element name="lastrefreshdate" type="s:dateTime" />
  <s:element name="creationdate" type="s:dateTime" />
  <s:element name="creator" type="s:string" />
  <s:element name="isScheduled" type="s:boolean" />
  <s:element name="scheduleStartTime" type="s:dateTime" />
  <s:element name="scheduleEndTime" type="s:dateTime" />
  <s:element name="tableType" type="s:string" />
  <s:element name="nbColumns" type="s:int" />
  <s:element name="nbLines" type="s:int" />
    </s:sequence>
  </s:complexType>
 </s:element>
- <s:element name="GetReportBlock_StateRevenueResponse">
- <s:complexType>
- <s:sequence>
  <s:element name="table" type="s0:TTable" />
  <s:element name="headers" type="s0:THeader" />
  <s:element name="footers" type="s0:TFooter" />
  <s:element name="user" type="s:string" />
  <s:element name="documentation" type="s:string" />
  <s:element name="documentname" type="s:string" />
  <s:element name="lastrefreshdate" type="s:dateTime" />
  <s:element name="creationdate" type="s:dateTime" />
  <s:element name="creator" type="s:string" />
  <s:element name="isScheduled" type="s:boolean" />
  <s:element name="scheduleStartTime" type="s:dateTime" />
  <s:element name="scheduleEndTime" type="s:dateTime" />
  <s:element name="tableType" type="s:string" />
  <s:element name="nbColumns" type="s:int" />
  <s:element name="nbLines" type="s:int" />
    </s:sequence>
  </s:complexType>
 </s:element>
- <s:element name="Drill_StateRevenueResponse">
- <s:complexType>
- <s:sequence>
  <s:element name="table" type="s0:TTable" />
  <s:element name="headers" type="s0:THeader" />
  <s:element name="footers" type="s0:TFooter" />
  <s:element name="user" type="s:string" />
  <s:element name="documentation" type="s:string" />
  <s:element name="documentname" type="s:string" />
  <s:element name="lastrefreshdate" type="s:dateTime" />
  <s:element name="creationdate" type="s:dateTime" />
  <s:element name="creator" type="s:string" />
  <s:element name="isScheduled" type="s:boolean" />
  <s:element name="scheduleStartTime" type="s:dateTime" />
  <s:element name="scheduleEndTime" type="s:dateTime" />
  <s:element name="tableType" type="s:string" />
  <s:element name="nbColumns" type="s:int" />
  <s:element name="nbLines" type="s:int" />
    </s:sequence>
  </s:complexType>
```

-continued

Exhibit A

```
      </s:element>
- <s:element name="QaaWSHeader">
- <s:complexType>
- <s:sequence>
    <s:element name="sessionID" type="s:string" />
    <s:element name="serializedSession" type="s:string" />
      </s:sequence>
      </s:complexType>
      </s:element>
      </s:schema>
      </types>
- <message name="GetReportBlock_StateQuantitiesSoapIn">
    <part name="parameters" element="s0:GetReportBlock_StateQuantities" />
    <part name="request_header" element="s0:QaaWSHeader" />
      </message>
- <message name="GetReportBlock_StateQuantitiesSoapOut">
    <part name="parameters" element="s0:GetReportBlock_StateQuantitiesResponse" />
      </message>
- <message name="Drill_StateQuantitiesSoapIn">
    <part name="parameters" element="s0:Drill_StateQuantities" />
    <part name="request_header" element="s0:QaaWSHeader" />
      </message>
- <message name="Drill_StateQuantitiesSoapOut">
    <part name="parameters" element="s0:Drill_StateQuantitiesResponse" />
      </message>
- <message name="GetReportBlock_StateRevenueSoapIn">
    <part name="parameters" element="s0:GetReportBlock_StateRevenue" />
    <part name="request_header" element="s0:QaaWSHeader" />
      </message>
- <message name="GetReportBlock_StateRevenueSoapOut">
    <part name="parameters" element="s0:GetReportBlock_StateRevenueResponse" />
      </message>
- <message name="Drill_StateRevenueSoapIn">
    <part name="parameters" element="s0:Drill_StateRevenue" />
    <part name="request_header" element="s0:QaaWSHeader" />
      </message>
- <message name="Drill_StateRevenueSoapOut">
    <part name="parameters" element="s0:Drill_StateRevenueResponse" />
      </message>
- <portType name="QueryAsAServiceSoap">
- <operation name="GetReportBlock_StateQuantities">
    <documentation />
    <input message="s0:GetReportBlock_StateQuantitiesSoapIn" />
    <output message="s0:GetReportBlock_StateQuantitiesSoapOut" />
      </operation>
- <operation name="Drill_StateQuantities">
    <documentation />
    <input message="s0:Drill_StateQuantitiesSoapIn" />
    <output message="s0:Drill_StateQuantitiesSoapOut" />
      </operation>
- <operation name="GetReportBlock_StateRevenue">
    <documentation />
    <input message="s0:GetReportBlock_StateRevenueSoapIn" />
    <output message="s0:GetReportBlock_StateRevenueSoapOut" />
      </operation>
- <operation name="Drill_StateRevenue">
    <documentation />
    <input message="s0:Drill_StateRevenueSoapIn" />
    <output message="s0:Drill_StateRevenueSoapOut" />
      </operation>
      </portType>
- <binding name="QueryAsAServiceSoap" type="s0:QueryAsAServiceSoap">
    <soap:binding transport="http://schemas.xmlsoap.org/soap/http" style="document" />
- <operation name="GetReportBlock_StateQuantities">
    <documentation />
    <soap:operation soapAction="TestDemo/GetReportBlock_StateQuantities"
       style="document" />
- <input>
- <soap:header message="s0:GetReportBlock_StateQuantitiesSoapIn"
       part="request_header" use="literal">
    <soap:headerfault message="s0:GetReportBlock_StateQuantitiesSoapIn"
       part="request_header" use="literal" />
      </soap:header>
    <soap:body use="literal" parts="parameters" />
      </input>
- <output>
    <soap:body use="literal" />
      </output>
```

-continued

Exhibit A

```
    </operation>
- <operation name="Drill_StateQuantities">
    <documentation />
    <soap:operation soapAction="TestDemo/Drill_StateQuantities" style="document" />
- <input>
- <soap:header message="s0:Drill_StateQuantitiesSoapIn" part="request_header"
        use="literal">
    <soap:headerfault message="s0:Drill_StateQuantitiesSoapIn" part="request_header"
        use="literal" />
    </soap:header>
    <soap:body use="literal" parts="parameters" />
        </input>
- <output>
    <soap:body use="literal" />
        </output>
    </operation>
- <operation name="GetReportBlock_StateRevenue">
    <documentation />
    <soap:operation soapAction="TestDemo/GetReportBlock_StateRevenue"
        style="document" />
- <input>
- <soap:header message="s0:GetReportBlock_StateRevenueSoapIn"
        part="request_header" use="literal">
    <soap:headerfault message="s0:GetReportBlock_StateRevenueSoapIn"
        part="request_header" use="literal" />
    </soap:header>
    <soap:body use="literal" parts="parameters" />
        </input>
- <output>
    <soap:body use="literal" />
        </output>
    </operation>
- <operation name="Drill_StateRevenue">
    <documentation />
    <soap:operation soapAction="TestDemo/Drill_StateRevenue" style="document" />
- <input>
- <soap:header message="s0:Drill_StateRevenueSoapIn" part="request_header"
        use="literal">
    <soap:headerfault message="s0:Drill_StateRevenueSoapIn" part="request_header"
        use="literal" />
    </soap:header>
    <soap:body use="literal" parts="parameters" />
        </input>
- <output>
    <soap:body use="literal" />
        </output>
    </operation>
    </binding>
- <service name="TestDemo">
    <documentation />
- <port name="QueryAsAServiceSoap" binding="s0:QueryAsAServiceSoap">
    <soap:address location="http://lv-l-01-
        3703:8080/dswsbobje/qaawsservices/queryasaservice?&cuid=AZEF.nTHJZFChvlDh
        giY4MY&authType=secEnterprise&locale=en&timeout=60" />
        </port>
    </service>
    </definitions>
```

What is claimed is:

1. A non transitory computer-readable medium having stored thereon program code, the program code executable by a computer to:

receive a user selection of a report;

display the user selected report in a view in a graphical user interface;

receive a user selection of a part of the report displayed in the view in the graphical user interface, the user selected report part associated with queries of a semantic layer, the report including a report part other than the user selected report part;

display, in a single view in a graphical user interface, (a) the user selected report part and (b) a control to initiate creation of a description of a Web Service call to return contents of the user selected report part;

receive a user selection of the control to initiate creation of a description of a Web Service call to return contents of the user selected report part;

in response to the user selection of the control to initiate creation of the description of the Web Service call to return contents of the user selected report part, create the description of the Web Service call to return contents of the user selected report part without creating a description of a Web Service call to return contents of the report part other than the user selected report part; and store the description of the Web Service call in a repository.

2. A medium according to claim 1, the program code further executable by a computer to:

create a description of a second Web Service call corresponding to the selected report part, the second Web Service call providing filtering parameters, wherein the second Web Service call is to return filtered contents of the selected report part based on the filtering parameters.

3. A medium according to claim 2, the program code further executable by a computer to:
create a description of a third Web Service call corresponding to the selected report part, the third Web Service call providing drilling parameters to specify a drilling direction, drilling steps and a drilling target,
wherein the third Web Service call is to return drilled-down contents of the selected report part based on the drilling parameters.

4. A medium according to claim 3,
wherein the third Web Service call further provides combination parameters, and
wherein the third Web Service call is to return drilled-down and filtered contents of the selected report part based on the combination parameters.

5. A medium according to claim 1, the program code further executable by a computer to:
create a description of a second Web Service call corresponding to the selected report part, the second Web Service call providing drilling parameters to specify a drilling direction, drilling steps and a drilling target,
wherein the second Web Service call is to return drilled-down contents of the selected report part based on the drilling parameters.

6. A medium according to claim 5,
wherein the second Web Service call further provides filtering parameters, and
wherein the second Web Service call is to return drilled-down and filtered contents of the selected report part based on the drilling and filtering parameters.

7. A medium according to claim 1, the program code further executable by a computer to:
create a description of a second Web Service call corresponding to the selected report part, the second Web Service call providing formatting parameters to specify a format of the formatted contents,
wherein the second Web Service call is to return formatted contents of the selected report part based on the formatting parameters.

8. A medium according to claim 7, the program code further executable by a computer to:
create a description of a third Web Service call corresponding to the selected report part, the third Web Service call providing drilling parameters to specify a drilling direction, drilling steps and a drilling target; and
create a description of a fourth Web Service call corresponding to the selected report part, the fourth Web Service call providing filtering parameters,
wherein the third Web Service call is to return drilled-down contents of the selected report part based on the drilling parameters, and
wherein the fourth Web Service call is to return filtered contents of the selected report part based on the filtering parameters.

9. A medium according to claim 1, wherein the report includes a chart or table;
wherein the display of the report in the view in the graphical user interface includes a display of the chart or table of the report;
wherein the user selected report part includes the chart or table of the report; and
wherein the display, in a single view in a graphical user interface, the user selected report part and a control to initiate creation of a description of a Web Service call to return contents of the user selected report part comprises:
display, in a single view in a graphical user interface, the user selected chart or table and a control to initiate creation of a description of a Web Service call to return contents of the chart or table.

10. A non transitory computer-readable medium having stored thereon program code, the program code executable by a computer to:
receive a Web Service call that is associated with: (i) a part of a report and (ii) a Web Service, the report part associated with queries of a semantic layer, the report including a report part other than the report part associated with the Web Service call, the Web Service not associated with a Web Service call that is associated with the other report part; and
determine, based on the Web Service call that is associated with the part of the report and the Web Service, a query to return contents of the report part;
wherein the Web Service includes a plurality of descriptions of Web Service calls that are to return contents of the report part and are stored in a repository.

11. A medium according to claim 10, wherein the program code executable by a computer to determine the query comprises program code executable by a computer to:
determine, based on the Web Service call, a second query to return a reference to the report part;
transmit the second query to a repository;
receive the reference to the report part from the repository; and
determine the query to return contents of the report part based on the reference to the report part.

12. A medium according to claim 11, wherein the program code is further executable by a computer to:
transmit the query to a report server; and
receive the contents of the report part from the report server.

13. A medium according to claim 10, wherein the program code is further executable by a computer to:
transmit the query to a report server;
receive the contents of the report part from the report server; and
create an HTTP message including the contents of the report part.

14. A medium according to claim 10, wherein the Web Service call is associated with filtering parameters, and wherein the program code executable by a computer to determine the query comprises program code executable by a computer to:
determine, based on the Web Service call, a query to return filtered contents of the report part based on the filtering parameters.

15. A medium according to claim 10, wherein the Web Service call is associated with drilling parameters to specify a drilling direction, drilling steps and a drilling target, and wherein the program code executable by a computer to determine the query comprises program code executable by a computer to:
determine, based on the Web Service call, a query to return drilled-down contents of the report part based on the drilling parameters.

16. A medium according to claim 10, wherein the Web Service call is associated with formatting parameters to specify a format of the formatted contents, and wherein the program code executable by a computer to determine the query comprises program code executable by a computer to:

determine, based on the Web Service call, a query to return formatted contents of the report part based on the formatting parameters.

17. A medium according to claim 10, wherein the plurality of descriptions of Web Service calls that are to return contents of the report part and are stored in a repository comprise:
a first description of a Web Service call that is to return contents of the report part and stored in a repository; and
a second description of a Web Service call that is to return filtered contents of the report part, is stored in a repository and is different than the first description of a Web Service call.

18. A system comprising:
a semantic layer;
a computer to provide a Web Service creator to: (i) receive a user selection of a report, (ii) display the user selected report in a view in a graphical user interface, (iii) receive a user selection of a part of the report displayed in the view in the graphical user interface, the user selected report part associated with queries of the semantic layer, the report including a report part other than the user selected report part, (iv) display, in a single view in a graphical user interface, (a) the user selected report part and (b) a control to initiate creation of a description of a Web Service call to return contents of the user selected report part, (v) receive a user selection of the control to initiate creation of a description of a Web Service call to return contents of the user selected report part, and (vi) in response to the user selection of the control to initiate creation of the description of the Web Service call to return contents of the user selected report part, issue an instruction to create the description of the Web Service call to return contents of the user selected report part;
a computer to provide a report server to: (i) receive the instruction to create the description of the Web Service call to return contents of the user selected report part, and (ii) in response to the instruction to create the description of the Web Service call to return contents of the user selected report part, create the description of the Web Service call to return contents of the user selected report part without creating a description of a Web Service call to return contents of the report part other than the user selected report part; and
a repository to store the description of the Web Service call.

19. A system according to claim 18, the report server further to:
create a description of a second Web Service call corresponding to the selected report part, the second Web Service call providing filtering parameters,
wherein the second Web Service call is to return filtered contents of the selected report part based on the filtering parameters.

20. A system according to claim 19, the report server further to:
create a description of a third Web Service call corresponding to the selected report part, the third Web Service call providing drilling parameters to specify a drilling direction, drilling steps and a drilling target,
wherein the third Web Service call is to return drilled-down contents of the selected report part based on the drilling parameters.

21. A system according to claim 18, the report server further to:
create a description of a second Web Service call corresponding to the selected report part, the second Web Service call providing drilling parameters to specify a drilling direction, drilling steps and a drilling target,
wherein the second Web Service call is to return drilled-down contents of the selected report part based on the drilling parameters.

22. A system according to claim 21,
wherein the second Web Service call further provides filtering parameters, and
wherein the second Web Service call is to return drilled-down and filtered contents of the selected report part based on the drilling and filtering parameters.

23. A system according to claim 18, further comprising:
a repository to store the contents of the report and the description of the Web Service call.

24. A system according to claim 18, wherein the report includes a chart or table;
wherein the display of the report in the view in the graphical user interface includes a display of the chart or table of the report;
wherein the user selected report part includes the chart or table of the report; and
wherein the display, in a single view in a graphical user interface, the user selected report part and a control to initiate creation of a description of a Web Service call to return contents of the user selected report part comprises:
display, in a single view in a graphical user interface, the user selected chart or table and a control to initiate creation of a description of a Web Service call to return contents of the chart or table.

25. A system comprising:
a semantic layer;
a computer to provide a Web Server to: (a) receive a Web Service call that is associated with: (i) a part of a report and (ii) a Web Service, the report part associated with queries of the semantic layer, the report including a report part other than the report part associated with the Web Service call, the Web Service not associated with a Web Service call that is associated with the other report part, and (b) determine, based on the Web Service call that is associated with the part of the report and the Web Service, a query to return contents of the report part; and
a computer to provide a report server to receive the query and to return the contents of the report part to the Web Server;
wherein the Web Service includes a plurality of descriptions of Web Service calls that are to return contents of the report part and are stored in a repository.

26. A system according to claim 25, further comprising:
a repository to store the contents of the report part, and to transmit the contents of the report part to the report server.

27. A system according to claim 26, the repository to store a description of the Web Service call.

28. A system according to claim 25, wherein the Web Server is further to create an HTTP message including the contents of the report part.

29. A system according to claim 25, wherein the Web Service call is associated with filtering parameters, wherein the query is to return filtered contents of the report part based on the filtering parameters, and wherein the contents of the report part returned by the report server are filtered based on the filtering parameters.

30. A system according to claim 25, wherein the Web Service call is associated with drilling parameters to specify a drilling direction, drilling steps and a drilling target, wherein the query is to return drilled-down contents of the report part based on the drilling parameters, and wherein the contents of the report part returned by the report server are drilled-down based on the drilling parameters.

31. A system according to claim 30,
wherein the Web Service call is associated with filtering parameters, and
wherein the query is to return drilled-down and filtered contents of the selected report part based on the drilling and filtering parameters.

32. A system according to claim 25, wherein the plurality of descriptions of Web Service calls that are to return contents of the report part and are stored in a repository comprise:
a first description of a Web Service call that is to return contents of the report part and stored in a repository; and
a second description of a Web Service call that is to return filtered contents of the report part, is stored in a repository and is different than the first description of a Web Service call.

33. A method comprising:
receiving a user selection of a report;
displaying the user selected report in a view in a graphical user interface;
receiving, by a computer, a user selection of a part of the report displayed in the view in the graphical user interface, the user selected report part associated with queries of a semantic layer, the report including a report part other than the user selected report part;
displaying, in a single view in a graphical user interface, (a) the user selected report part and (b) a control to initiate creation of a description of a Web Service call to return contents of the user selected report part;
receiving, by the computer, a user selection of the control to initiate creation of a description of a Web Service call to return contents of the user selected report part;
in response to the user selection of the control to initiate creation of the description of the Web Service call to return contents of the user selected report part, issuing, by the computer, an instruction to create the description of the Web Service call to return contents of the user selected report part;
in response to the instruction to create the description of the Web Service call to return contents of the user selected report part, creating, by a computer, the description of the Web Service call to return contents of the user selected report part without creating a description of a Web Service call to return contents of the report part other than the user selected report part; and
storing the description of the Web Service call in a repository.

34. A method according to claim 33, the method further comprising:
creating a description of a second Web Service call corresponding to the selected report part, the second Web Service call providing filtering parameters,
wherein the second Web Service call is to return filtered contents of the selected report part based on the filtering parameters.

35. A method according to claim 34, the method further comprising:
creating a description of a third Web Service call corresponding to the selected report part, the third Web Service call providing drilling parameters to specify a drilling direction, drilling steps and a drilling target,
wherein the third Web Service call is to return drilled-down contents of the selected report part based on the drilling parameters.

36. A method according to claim 35,
wherein the third Web Service call further provides combination parameters, and
wherein the third Web Service call is to return drilled-down and filtered contents of the selected report part based on the combination parameters.

37. A method according to claim 33, the method further comprising:
creating a description of a second Web Service call corresponding to the selected report part, the second Web Service call providing drilling parameters to specify a drilling direction, drilling steps and a drilling target,
wherein the second Web Service call is to return drilled-down contents of the selected report part based on the drilling parameters.

38. A method according to claim 37,
wherein the second Web Service call further provides filtering parameters, and
wherein the second Web Service call is to return drilled-down and filtered contents of the selected report part based on the drilling and filtering parameters.

39. A method according to claim 33, the method further comprising:
creating a description of a second Web Service call corresponding to the selected report part, the second Web Service call providing formatting parameters to specify a format of the formatted contents,
wherein the second Web Service call is to return formatted contents of the selected report part based on the formatting parameters.

40. A method according to claim 39, the method further comprising::
creating a description of a third Web Service call corresponding to the selected report part, the third Web Service call providing drilling parameters to specify a drilling direction, drilling steps and a drilling target; and
creating a description of a fourth Web Service call corresponding to the selected report part, the fourth Web Service call providing filtering parameters,
wherein the third Web Service call is to return drilled-down contents of the selected report part based on the drilling parameters, and
wherein the fourth Web Service call is to return filtered contents of the selected report part based on the filtering parameters.

41. A method according to claim 33, wherein the report includes a chart or table;
wherein the display of the report in the view in the graphical user interface includes a display of the chart or table of the report;
wherein the user selected report part includes the chart or table of the report; and
wherein the displaying, in a single view in a graphical user interface, the user selected report part and a control to initiate creation of a description of a Web Service call to return contents of the user selected report part comprises:
displaying, in a single view in a graphical user interface, the user selected chart or table and a control to initiate creation of a description of a Web Service call to return contents of the chart or table.

42. A method comprising:
receiving, by a computer, a Web Service call that is associated with: (i) a part of a report and (ii) a Web Service, the report part associated with queries of a semantic layer, the report including a report part other than the report part associated with the Web Service call, the Web Service not associated with a Web Service call that is associated with the other report part; and determining, by a computer and based on the Web Service call that is associated with the part of the report and the Web Service, a query to return contents of the report part;

wherein the Web Service includes a plurality of descriptions of Web Service calls that are to return contents of the report part and are stored in a repository.

43. A method according to claim 42, the method further comprising:

determining, based on the Web Service call, a second query to return a reference to the report part;

transmitting the second query to a repository;

receiving the reference to the report part from the repository; and determining the query to return contents of the report part based on the reference to the report part.

44. A method according to claim 43, the method further comprising:

transmitting the query to a report server; and receiving the contents of the report part from the report server.

45. A method according to claim 42, the method further comprising:

transmitting the query to a report server;

receiving the contents of the report part from the report server; and creating an HTTP message including the contents of the report part.

46. A method according to claim 42, wherein the Web Service call is associated with filtering parameters, and wherein the method further comprises:

determining, based on the Web Service call, a query to return filtered contents of the report part based on the filtering parameters.

47. A method according to claim 42, wherein the Web Service call is associated with drilling parameters to specify a drilling direction, drilling steps and a drilling target, and wherein the method further comprises:

determining, based on the Web Service call, a query to return drilled-down contents of the report part based on the drilling parameters.

48. A method according to claim 42, wherein the Web Service call is associated with formatting parameters to specify a format of the formatted contents, and \
wherein the method further comprises:

determining, based on the Web Service call, a query to return formatted contents of the report part based on the formatting parameters.

49. A method according to claim 42, wherein the plurality of descriptions of Web Service calls that are to return contents of the report part and are stored in a repository comprise:

a first description of a Web Service call that is to return contents of the report part and stored in a repository; and a second description of a Web Service call that is to return filtered contents of the report part, is stored in a repository and is different than the first description of a Web Service call.

* * * * *